(12) United States Patent
Ito et al.

(10) Patent No.: US 7,216,627 B2
(45) Date of Patent: May 15, 2007

(54) INTERNAL COMBUSTION ENGINE PROVIDED WITH DOUBLE SYSTEM OF FUEL INJECTION

(75) Inventors: Yukikazu Ito, Aichi-ken (JP); Yutaka Iwami, Iwata (JP); Masato Nishigaki, Iwata (JP)

(73) Assignees: Toyota Jidosha Kabushiki Kaisha, Aichi-Ken (JP); Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/378,070

(22) Filed: Mar. 17, 2006

(65) Prior Publication Data
US 2006/0207555 A1    Sep. 21, 2006

(30) Foreign Application Priority Data
Mar. 18, 2005    (JP)    ............... 2005-080698

(51) Int. Cl.
F02P 5/15    (2006.01)
F02D 43/04    (2006.01)
F02B 15/00    (2006.01)

(52) U.S. Cl. ................. 123/406.47; 123/406.52; 123/406.55; 123/406.59; 123/406.65; 123/431

(58) Field of Classification Search ........... 123/406.47, 123/406.52, 406.55, 406.59, 406.6, 406.64, 123/406.65, 431, 478, 486
See application file for complete search history.

(56) References Cited

U.S. PATENT DOCUMENTS

| | | | |
|---|---|---|---|
| 3,998,614 A | 12/1976 | Schonberger et al. | |
| 4,257,375 A | 3/1981 | Ulrich | |
| 4,373,491 A | 2/1983 | Knapp | |
| 4,526,152 A | 7/1985 | Hideg et al. | |
| 4,694,808 A | 9/1987 | Peters | |
| 5,094,210 A | 3/1992 | Endres et al. | |
| 5,251,582 A | 10/1993 | Mochizuki | |
| 5,265,562 A | 11/1993 | Kruse | |
| 5,460,128 A | 10/1995 | Kruse | |
| 5,566,650 A | 10/1996 | Kruse | |
| 5,608,632 A | 3/1997 | White | |

(Continued)

FOREIGN PATENT DOCUMENTS

DE    37 07 805    9/1987

(Continued)

*Primary Examiner*—T. M. Argenbright
(74) *Attorney, Agent, or Firm*—Knobbe Martens Olson & Bear LLP

(57) ABSTRACT

An internal combustion engine includes an engine control unit for setting a ratio of fuel injection quantity of both the injectors. The engine control unit includes a memory storing four sheets of ignition timing maps, with reference to which the maximum torque generation timing and knocking limit torque generation timing, at the direct injection injector (100%) and port fuel injection injector (100%), are calculated. The engine control unit further operates to calculate a correction amount from correction amount map, and calculates first interpolation value of the maximum torque generation timing at the above 100% operation time of both the injectors and second interpolation value of the knocking limit torque generation timing at the above 100% operation time of both the injectors. A value in which the correction amount is added to either one of the above first and second interpolation value on a delay angle side is calculated as ignition timing.

5 Claims, 7 Drawing Sheets

U.S. PATENT DOCUMENTS

| | | | |
|---|---|---|---|
| 5,894,832 A | 4/1999 | Nogi et al. | |
| 5,924,405 A | 7/1999 | Hashimoto | |
| 6,024,064 A | 2/2000 | Kato et al. | |
| 6,039,029 A | 3/2000 | Nagasaka et al. | |
| 6,058,904 A | 5/2000 | Kruse | |
| 6,192,857 B1* | 2/2001 | Shimada | 123/295 |
| 6,340,014 B1 | 1/2002 | Tomita et al. | |
| 6,405,704 B2 | 6/2002 | Kruse | |
| 6,467,465 B1 | 10/2002 | Lorts | |
| 6,539,923 B1 | 4/2003 | Mengoli | |
| 6,637,406 B2 | 10/2003 | Yamada et al. | |
| 6,662,777 B2 | 12/2003 | Tsuchiya | |
| 6,827,064 B2 | 12/2004 | Akagi et al. | |
| 6,843,219 B2 | 1/2005 | Matsuda et al. | |
| 7,013,874 B2 | 3/2006 | Kurayoshi et al. | |
| 2001/0047794 A1 | 12/2001 | Kato | |
| 2004/0007209 A1 | 1/2004 | Ohtani | |
| 2005/0205067 A1 | 9/2005 | Koide et al. | |
| 2006/0096575 A1* | 5/2006 | Araki et al. | 123/406.47 |
| 2006/0207527 A1* | 9/2006 | Saeki et al. | 123/431 |
| 2006/0207554 A1* | 9/2006 | Nakamura | 123/406.47 |
| 2006/0207568 A1* | 9/2006 | Miyazaki et al. | 123/431 |
| 2006/0212208 A1* | 9/2006 | Uchida et al. | 701/104 |

FOREIGN PATENT DOCUMENTS

| | | |
|---|---|---|
| EP | 0 169 481 A | 1/1986 |
| EP | 1 030 048 A2 | 8/2000 |
| EP | 1 096 138 A2 | 5/2001 |
| EP | 1 096 138 A3 | 5/2001 |
| EP | 1 293 653 | 3/2003 |
| EP | 1 387 081 A2 | 2/2004 |
| EP | 1 396 633 A2 | 3/2004 |
| EP | 1 533 518 A1 | 5/2005 |
| GB | 2 009 843 A | 10/2001 |
| JP | 49-081719 | 6/1974 |
| JP | 63-098479 | 6/1988 |
| JP | 63-138119 | 6/1988 |
| JP | 03-015622 | 1/1991 |
| JP | 03-275978 | 12/1991 |
| JP | 4-94434 | 3/1992 |
| JP | 7-247924 | 9/1995 |
| JP | 07-269394 | 10/1995 |
| JP | 7-332208 | 12/1995 |
| JP | 8-109861 | 4/1996 |
| JP | 8-121285 | 5/1996 |
| JP | 8-144889 | 6/1996 |
| JP | 10-054318 | 2/1998 |
| JP | 10-115270 | 5/1998 |
| JP | 10-141194 | 5/1998 |
| JP | 10-227239 | 8/1998 |
| JP | 11-082250 | 3/1999 |
| JP | 11-132076 | 5/1999 |
| JP | 11-159424 | 6/1999 |
| JP | 11-315733 | 11/1999 |
| JP | 11-324765 | 11/1999 |
| JP | 11-350966 | 12/1999 |
| JP | 2000-97131 | 4/2000 |
| JP | 2000-97132 | 4/2000 |
| JP | 2000-130234 | 5/2000 |
| JP | 2000-240494 | 9/2000 |
| JP | 2001-115919 | 4/2001 |
| JP | 2001-164961 | 6/2001 |
| JP | 2001-248478 | 9/2001 |
| JP | 2002-047973 | 2/2002 |
| JP | 2002-048035 | 2/2002 |
| JP | 2002-195141 | 7/2002 |
| JP | 2002-317738 | 10/2002 |
| JP | 2004-027911 | 1/2004 |
| JP | 2004-270531 | 9/2004 |
| JP | 2006-57594 | 3/2006 |
| WO | WO 01/79690 A1 | 10/2001 |

* cited by examiner (A) First ignition timing map
(DI = 100%, MBT)

(B) Second ignition timing map
(DI = 100%, TK)

(C) Third ignition timing map
(PFI = 100%, MBT)

(D) Fourth ignition timing map
(PFI = 100%, TK)

| Water temperature (°C) | A | B | ····· | N |
|---|---|---|---|---|
| Correction amount (deg) | +2 | +1 | ····· | -2 |

Correction amount map

INTERNAL COMBUSTION ENGINE PROVIDED WITH DOUBLE SYSTEM OF FUEL INJECTION

CROSS REFERENCE TO RELATED APPLICATION

This application is based upon and claims the benefit of priority from prior Japanese Patent Application No. 2005-080698 filed on Mar. 18, 2005, the entire contents of which are incorporated herein by reference.

BACKGROUND OF THE INVENTION

1. Field of the Invention

The present invention relates to an internal combustion engine provided with double system of fuel injection including a port fuel injection (PFI) system and a direct injection (DI) system.

2. Related Art

In an internal combustion engine of an automobile, a knocking may be caused at a time when an automobile is rapidly accelerated from a low speed running thereof.

The knocking is a phenomenon in which unburned fuel-air mixture in front of a propagation flame is compressed to a high temperature and then self-ignited due to incompatibility between engine load and engine ignition timing, and a large pressure wave generated at a combustion period in a combustion chamber vibrates a wall of the combustion chamber. According to the generation of such knocking, temperature and pressure in the combustion chamber are abnormally increased, which may cause damage to the combustion chamber. Because of this reason, various counter-measures have been considered in prior art, for example, as disclosed in Japanese Patent Laid-open (KO-KAI) Publication No. HEI 10-141194).

In this publication, there is disclosed a control unit for controlling an ignition timing of an internal combustion engine, in which the ignition timing is set to a maximum torque generation timing (MBT: Minimum Spark Advance for Best Torque) in a low load range at which any knocking never be caused, and on the contrary, the ignition timing is set to a knocking limit torque generation timing (TK) based on knocking detection in a high load range at which the knocking may be liable to be caused. The knocking limit means a timing at which a knocking noise (trace knock) is first detected during advancing of the ignition timing.

However, in the invention disclosed in the above prior art publication, the ignition timing control is applicable to an internal combustion engine in which one fuel supply device is used for one cylinder.

Incidentally, fuel injection modes is classified into a PFI system (Port Fuel Injection System) in which fuel is injected from an injector to an intake pipe for each cylinder and a DI system (Direct Injection System) in which fuel is injected directly in each cylinder from an injector.

In the PFI system, fuel is easily mixed uniformly with air, and accordingly, in low revolution speed operation of the engine (low engine revolution speed), the engine performance can be fully achieved. On the other hand, in the DI system, since a lot of air is sucked into the cylinder, the high engine performance can be achieved in high revolution speed operation of the engine (high engine revolution speed). In order to achieve more effective combustion performance of the internal combustion engine by utilizing the above advantages of both systems, there may provide a system in which both PFI system and DI system are parallelly arranged for each cylinder of the engine so that a ratio of fuel injection quantity from each of both the systems (i.e. injectors) is changed in accordance with the engine revolution and engine load.

However, the PFI system and DI system differ from each other in their maximum torque generation timings, the knocking limit torque generation timing and so on. Therefore, even if the invention of the above-mentioned prior art patent publication is applied to the case in which both systems are parallelly arranged for each cylinder of the engine, an optimum ignition timing cannot be achieved.

SUMMARY OF THE INVENTION

An object of the present invention is therefore to substantially eliminate defects or drawbacks encountered in the prior art publication mentioned above and to provide an internal combustion engine which has double system of fuel injection including both PFI system and DI system and is capable of avoiding the generation of knocking through easy arithmetic (operation) processing and realizing an optimum ignition timing.

This and other objects can be achieved according to the present invention by providing an internal combustion engine provided with double system of fuel injection, comprising:

a direct injection injector;

a port fuel injection injector;

an engine operating condition detection unit for detecting engine operating condition;

a fuel injection quantity control unit for monitoring the engine operating condition and controlling respective fuel injection quantity of the direct injection injector and the port fuel injection injector depending on the engine operating condition;

a memory unit incorporated with four sheets of ignition timing maps including a first ignition timing map allocated on the basis of the engine operating condition so that the ignition timing of the engine at the fuel injection using only the direct injection injector substantially accords with the maximum torque generation timing, a second ignition timing map allocated on the basis of the engine operating condition so that the ignition timing of the engine at the fuel injection using only the direct injection injector substantially accords with the knocking limit torque generation timing, a third ignition timing map allocated on the basis of the engine operating condition so that the ignition timing of the engine at the fuel injection using only the port fuel injection injector substantially accords with the maximum torque generation timing, and a fourth ignition timing map allocated on the basis of the engine operating condition so that the ignition timing of the engine at the fuel injection using only the port fuel injection injector substantially accords with the knocking limit torque generation timing; and an ignition timing control unit for controlling the ignition timing of the cylinder by using a ratio of fuel injection quantity of the direct injection injector to that of the port fuel injection injector and the four sheets of the ignition timing maps.

In a preferred embodiment of the present invention, the internal combustion engine may further include an ignition timing calculation unit for calculating a basic ignition timing with reference to the values allocated in the first to fourth ignition timing maps, calculating a first interpolation value obtained by performing interpolation operation of the basic ignition timing of the first ignition timing map and the basic ignition timing of the third ignition timing map depending on the ratio of the fuel injection quantity, calculating a second interpolation value obtained by performing interpolation operation of the basic ignition timing of the second ignition timing map and the basic ignition timing of the fourth ignition timing map depending on the ratio of the fuel injection quantity, and comparing the first and second interpolation values with each other to thereby determine either one of the interpolation values on a delay angle side as the ignition timing.

The engine operating condition detection unit may include a water temperature detection sensor for detecting a cooling water of the internal combustion engine, and the ignition timing calculation unit serving to calculate a correction amount of the ignition timing depending on the water temperature of the cooling water.

The engine operating condition detection unit may include a revolution speed detector means for detecting a revolution speed of an internal combustion engine, and a load detector for detecting the load of an internal combustion engine.

The engine load detector may include at least either one of an intake air amount detector, an accelerator opening detector and an intake pipe negative pressure detector.

According to the structures and characters of the present invention mentioned above, by controlling the ignition timing with reference to the first to fourth ignition timing maps, the ignition timing can correspond, through easy calculation processing, to the direct injection system and port fuel injection system which are different in the maximum torque generation timing and the knocking limit torque generation timing. Therefore, in the internal combustion engine provided with double system of fuel injection, i.e. direct injection injector and port fuel injection injector, the generation of the knocking can be avoided with the easy operation processing, and thereby, an optimum ignition timing can be set.

According to the preferred embodiment of the present invention, in the internal combustion engine provided with double system of fuel injection, i.e. direct injection injector and the port fuel injection injector, the ignition timing can be always regulated and maintained to a condition suitable for the optimum operation of the internal combustion engine, the generation of the knocking can be avoided, and hence, the optimum ignition timing can be set only by utilizing the four sheets of ignition timing maps even in the case where the engine is operated under the regulation of the fuel injection quantity of the direct injection injector and the port fuel injection injector in accordance with the operating condition of the engine without performing complicated calculation operation.

In addition, according to the present embodiment, the engine operating condition can be detected by the engine revolution detector and the engine load detector, and therefore, the ignition timing can be controlled with reference to the parameters of the engine revolution speed and the engine load, thus realizing the optimum ignition timing control with high precision.

Furthermore, in the case of the location of at least either one of an intake air amount detector, an accelerator opening detector and an intake pipe negative pressure detector, the load amount applied to the engine can be precisely detected and, hence, the ignition timing can be accurately controlled.

Still furthermore, the location of the cooling water temperature detector enables the calculation of the correction amount of the ignition timing and adjustment of the ignition timing based on the warm-up condition of the engine, thus enhancing the controlling performance to the ignition timing.

The nature and further characteristic features of the present invention will be made more clear from the following descriptions made with reference to the accompanying drawings.

DESCRIPTION OF THE PREFERRED EMBODIMENT

Figure 1:
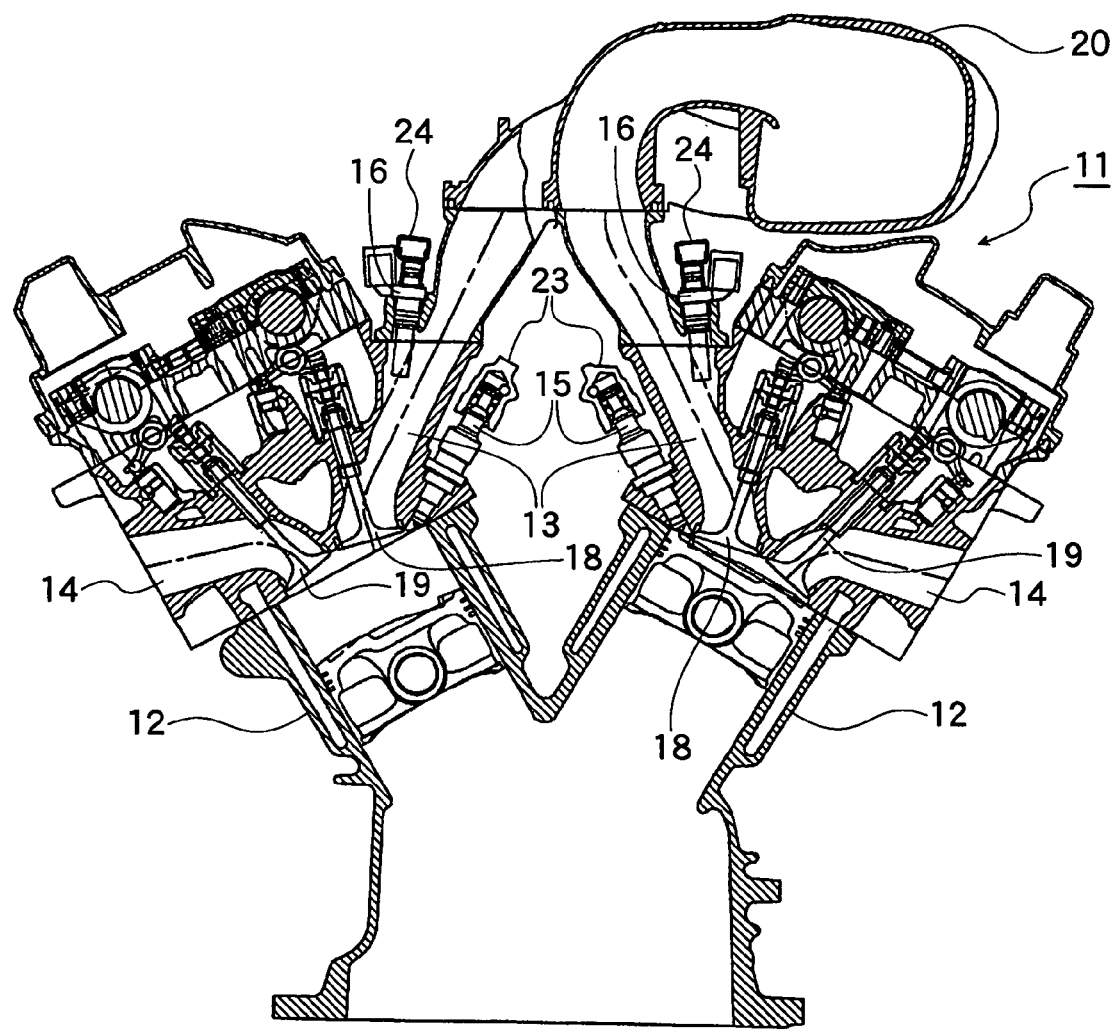
FIG. 1 is a sectional view, i.e., elevational section, of an internal combustion engine according to one embodiment of the present invention.
Figure 2:
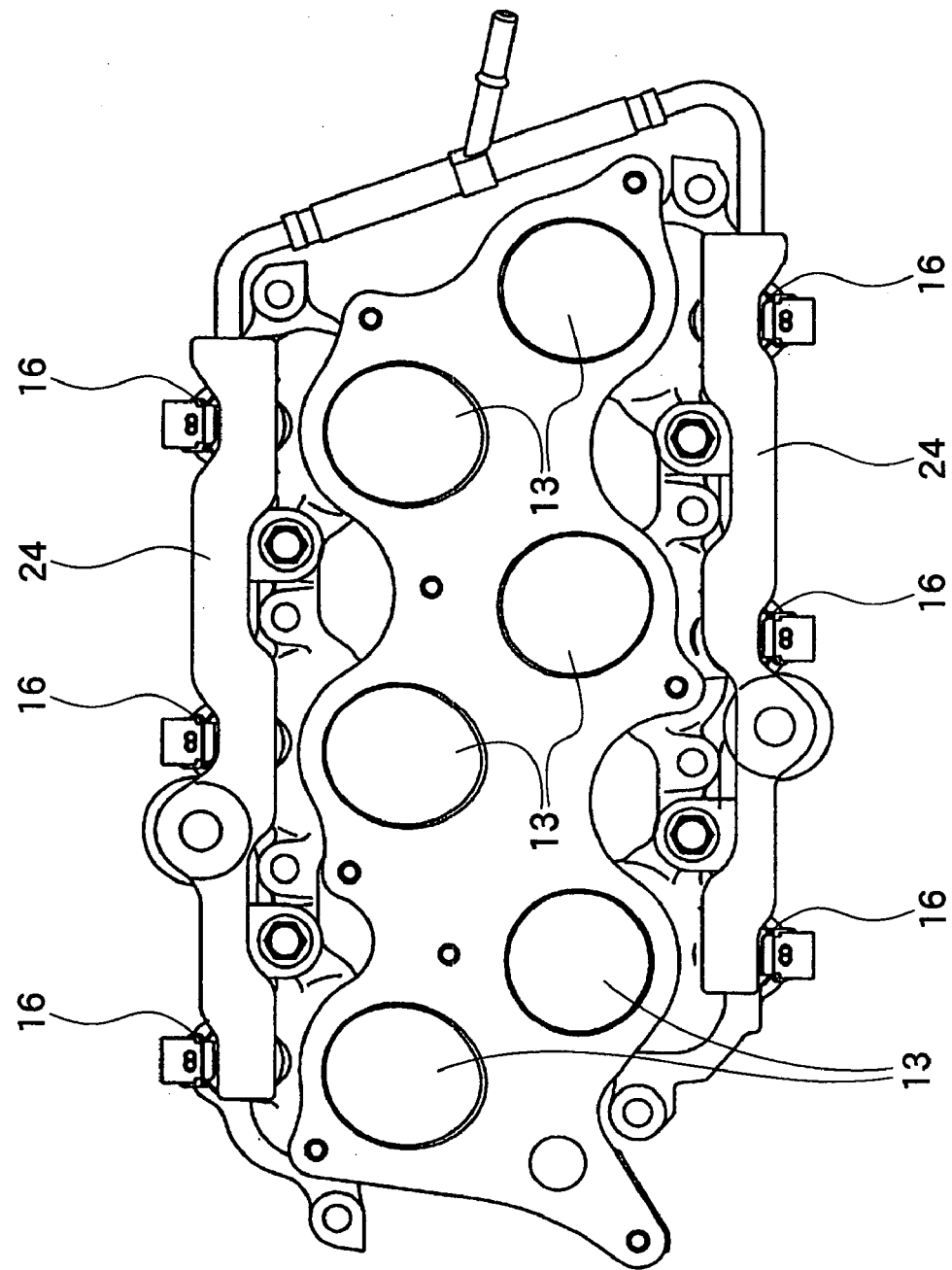
FIG. 2 is a plan view of a block diagram in which a PFI injector is set in the above embodiment of FIG. 1.
Figure 3:
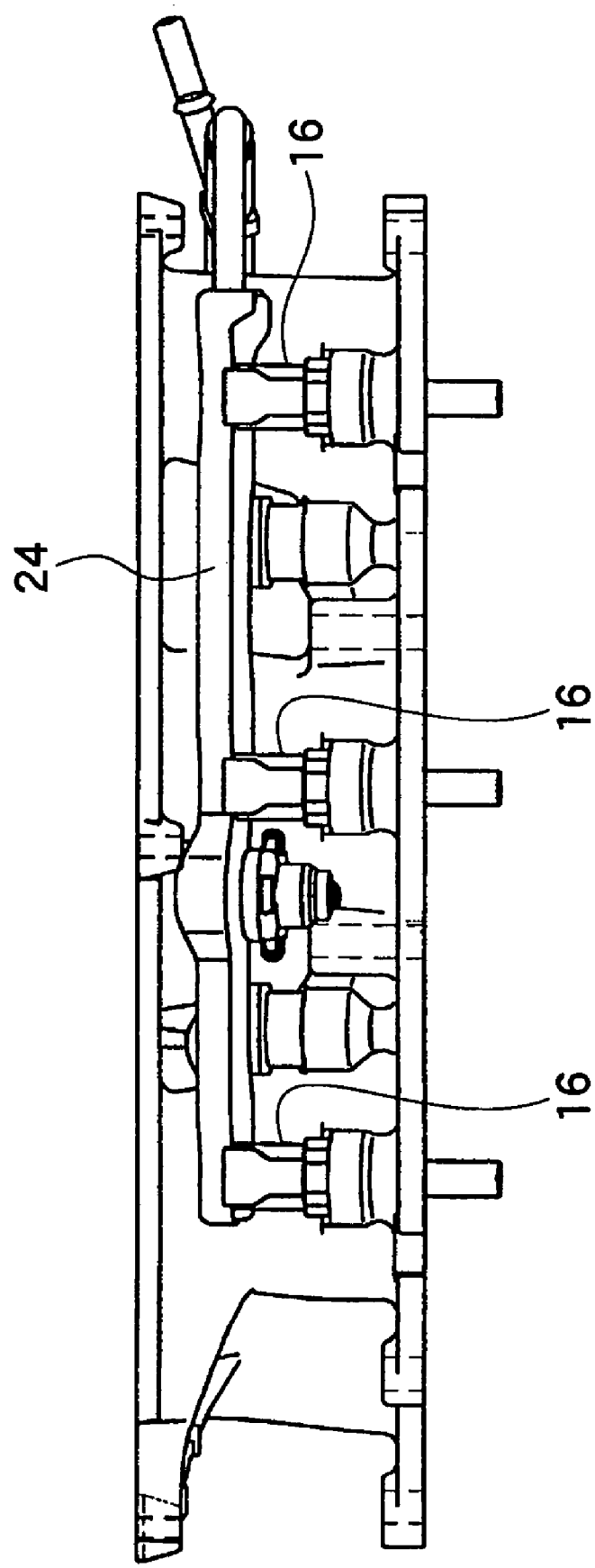
FIG. 3 is a front view of FIG. 2.

One preferred embodiment according to the present invention will be described hereunder with reference to the accompanying drawings.

With reference to FIGS. 1 to 8, reference numeral 11 denotes a V-type 6-cylinder engine as an internal combustion engine (which may be called hereinlater merely "engine") of the present invention, in which an intake port 13 and an exhaust port 14 are connected to each of the cylinders 12, which is in addition provided with a direct injection-type injector (DI injector) 15 and a port fuel injection-type injector (PFI injector) 16.

The fuel is directly injected into the cylinder, i.e., combustion chamber 12 from the DI injector 15 and is then mixed with air in the cylinder 12, and in addition, the fuel is injected into the intake port 13 through the PFI injector 16 and is then mixed with air passing in the intake port 13. The thus mixed fuel is sucked in the cylinder 12 and burnt therein by an ignition of an ignition plug 14a, not shown, at a predetermined timing.

Further, each of the cylinders 12 is also provided with an intake valve 18 for opening or closing the intake port and an exhaust valve 19 for opening or closing the exhaust port, and by opening the intake valve 18, a clean air is introduced into the cylinder 12, i.e. combustion chamber, from a serge tank 20 through the intake port 13.

As shown in FIGS. 1 to 4, the respective DI injectors 15 arranged for the respective cylinders 12 are coupled with each other through direct injection delivery pipes (DI delivery pipes) 23, and the respective PFI injectors 16 are also coupled with each other through port fuel injection delivery pipes (PFI delivery pipes) 24. The DI delivery pipes 23 are connected through a direct injection conduit (DI conduit) 26 so that the injected fuel circulates to a fuel tank 28, and the PFI delivery pipes 24 are connected to the fuel tank 28 through an intake pipe injection conduit (PFI conduit) 27.

Figure 4:
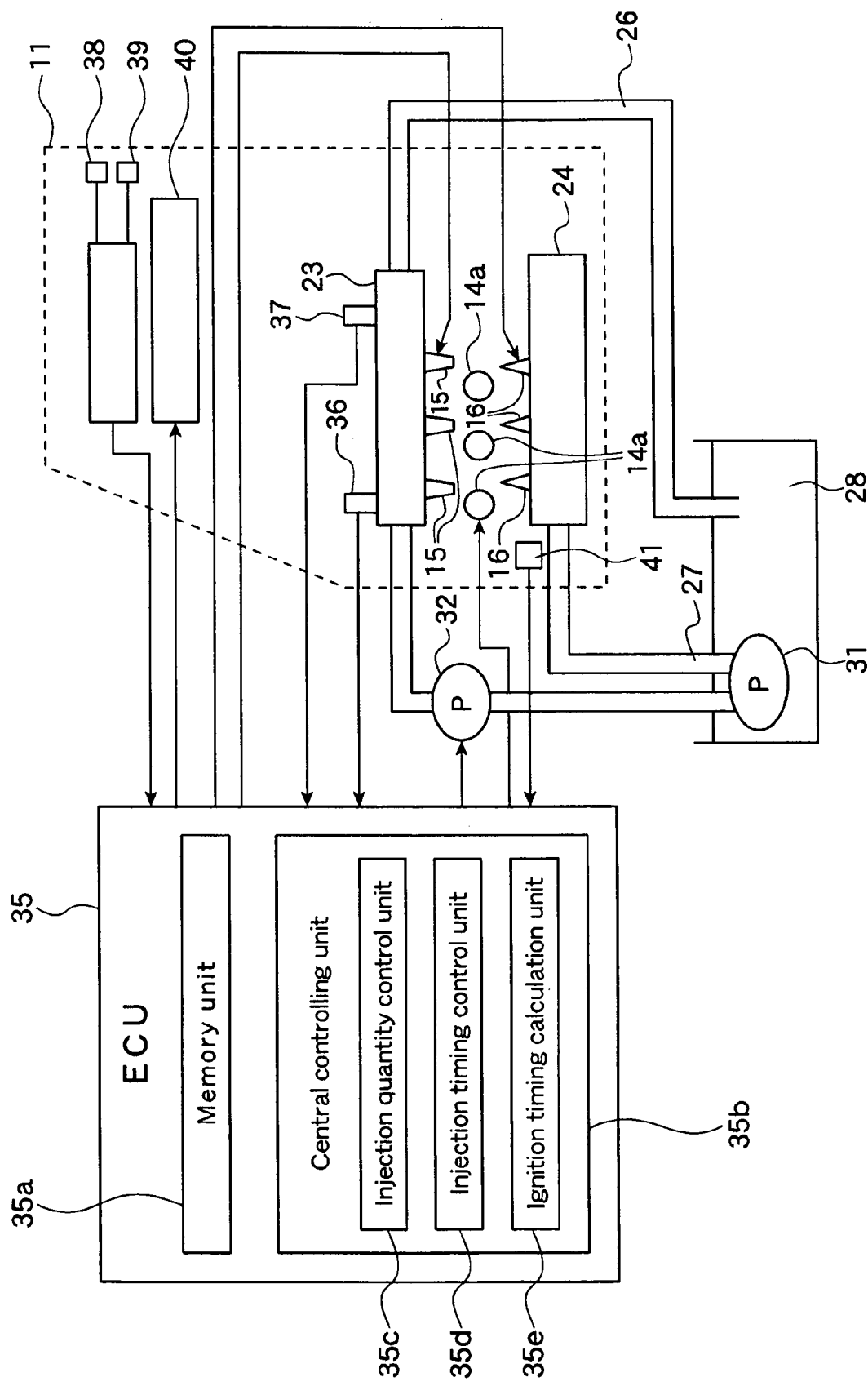
FIG. 4 is a block diagram for explaining a controlling of the internal combustion engine of this embodiment.

As shown in FIG. 4, the fuel is delivered, at a predetermined high pressure, to the DI delivery pipe 23 by means of a fuel pump 31 and a high pressure pump 32, and the fuel is also delivered, at a pressure lower than that on the DI delivery pipe side, to the PFI delivery pipe 24 by means of the fuel pump 31. For the DI injector 15, in order to directly inject the fuel in the highly pressurized cylinder 12, a high pressure is required.

These injectors 15 and 16 inject the fuel, at a predetermined amount, delivered at the predetermined fuel pressure by the fuel pumps 31 and 32 by opening solenoid valves, not shown, by a predetermined injecting time period.

These injectors 15 and 16 are connected to an engine control unit (ECU) 35 as control means so as to control opening (or closing) timing and opening (or closing) time interval of the solenoid valves.

A fuel pressure sensor 36 and a fuel temperature sensor 37 incorporated to the DI delivery pipe 23 are connected to the ECU 35, as well as an engine revolution speed (number) sensor 38 as revolution speed detector (detection) means for detecting the engine revolution speed, an engine load sensor 39 as engine load detector (detection) means for detecting the engine load and a water temperature sensor 41 as water temperature detection means for detecting a temperature of an engine cooling water. The engine operating condition is detected by the engine revolution speed sensor 38 and the engine load sensor 39, and the engine temperature condition is detected by the water temperature sensor 41.

Engine operating condition detection means or unit for detecting engine operating condition comprises revolution speed detection means, engine load detection means and water temperature detection means.

As such engine load sensor 39, there may be utilized, for example, either one of a sensor for detecting intake air quantity as an intake air amount detector (detection) means, a sensor for detecting an accelerator opening as an accelerator opening detector (detection) means, a sensor for detecting an intake pipe negative pressure as an intake pipe negative pressure detector (detection) means or the like.

Furthermore, various actuators 40 are also connected to the ECU 35 so that these actuators 40 are controlled in response to signals from the ECU 35. The ECU 35 obtains informations from the engine revolution speed sensor 38, the engine load sensor 39 and the water temperature sensor 41 at predetermined sampling timings and serves to provide a required injection quantity necessary for the injection of the fuel into the respective cylinders 12 through the DI injectors 15 and the PFI injectors 16, respectively.

According to such operation of the ECU 35, the ignition timing for ignition of the fuel-air mixture in the combustion chamber is controlled.

More specifically, the ECU 35 is provided with memory means (memory unit 35a) for storing ignition timing maps in response to the operating condition of the internal combustion engine and a central controlling means (central controlling unit 35b) which performs calculation using values in these ignition timing maps based on an incorporated software to thereby control the ignition timing in response to the operating condition of the engine.

Moreover, the central controlling unit 35b of the ECU 35 cooperates with various programs stored in the memory means to enable injection quantity control means (injection quantity control unit 35c) for controlling fuel injection quantity of the DI injector 15 and PFI injector 16, ignition timing control means (ignition timing control unit 35d) for controlling the ignition timing of the cylinder 12, ignition timing calculation means (ignition timing calculation unit 35e) for calculating the ignition timing and the like means to achieve their functions.

The ECU 35 is equipped with four sheets of ignition timing maps and correction amount maps.

FIG. 5 shows the four sheets of ignition timing maps provided for the ECU 35.

Figure 5A:
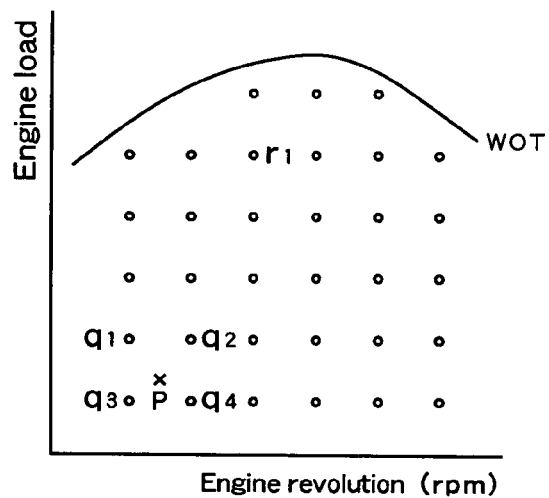
FIG. 5, including FIGS. 5A to 5D, showing maps of ignition timings in the internal combustion engine of this embodiment.

(1) First map (A) as in FIG. 5A represents a first ignition timing map allocated on the basis of the operating (running) condition of the internal combustion engine so that the ignition timing of the engine at the fuel injection using only the DI injector 15 substantially accords with the maximum torque generation timing (i.e. Minimum Spark Advance for Best Torque (MBT)).

Figure 5B:
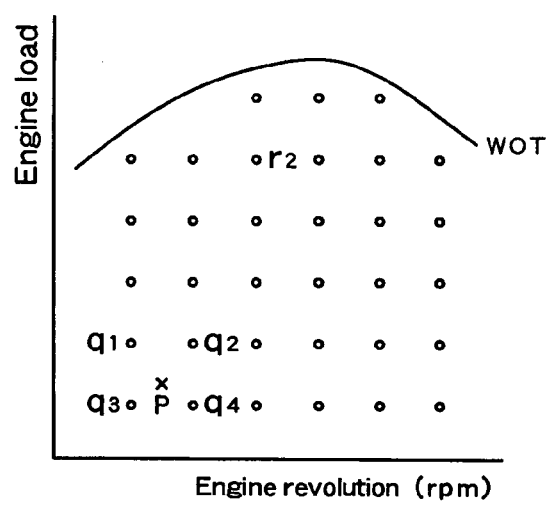

(2) Second map (B) as in FIG. 5B represents a second ignition timing map allocated on the basis of the operating condition of the internal combustion engine so that the ignition timing of the engine at the fuel injection using only the DI injector 15 substantially accords with the knocking limit torque generation timing (TK).

Figure 5C:
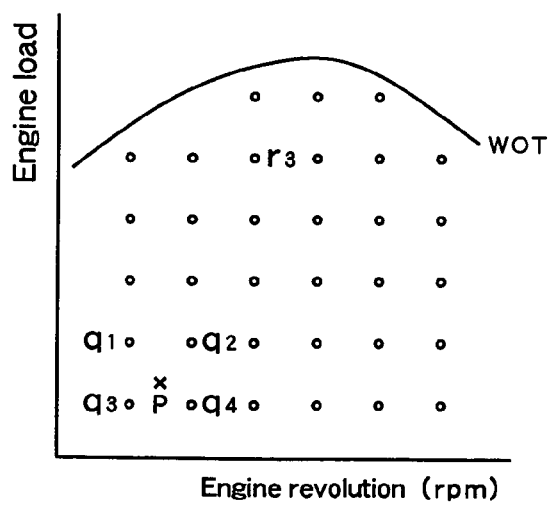

(3) Third map (C) as in FIG. 5C represents a third ignition timing map allocated on the basis of the operating (running) condition of the internal combustion engine so that the ignition timing of the engine at the fuel injection using only the PFI injector 16 substantially accords with the MBT.

Figure 5D:
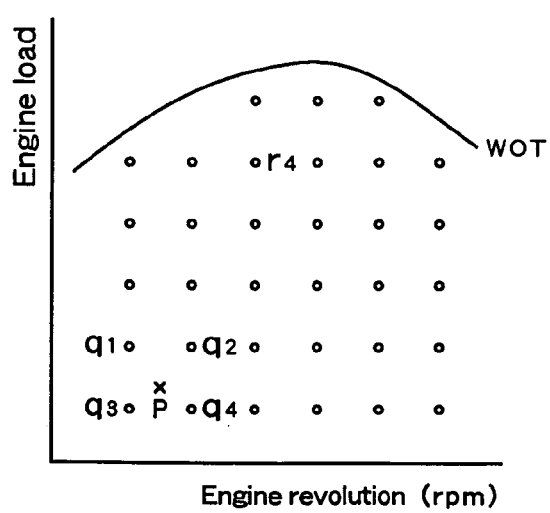

(4) Fourth map (D) as in FIG. 5D represents a fourth ignition timing map allocated on the basis of the operating condition of the internal combustion engine so that the ignition timing of the engine at the fuel injection using only the PFI injector 16 substantially accords with the TK.

The respective ignition timing maps are allocated with values of ignition timings at every predetermined interval, with respect to a value up to a wide open throttle (WOT), with the engine revolution speed (rpm) and engine load being parameters.

Figures 6, 7:
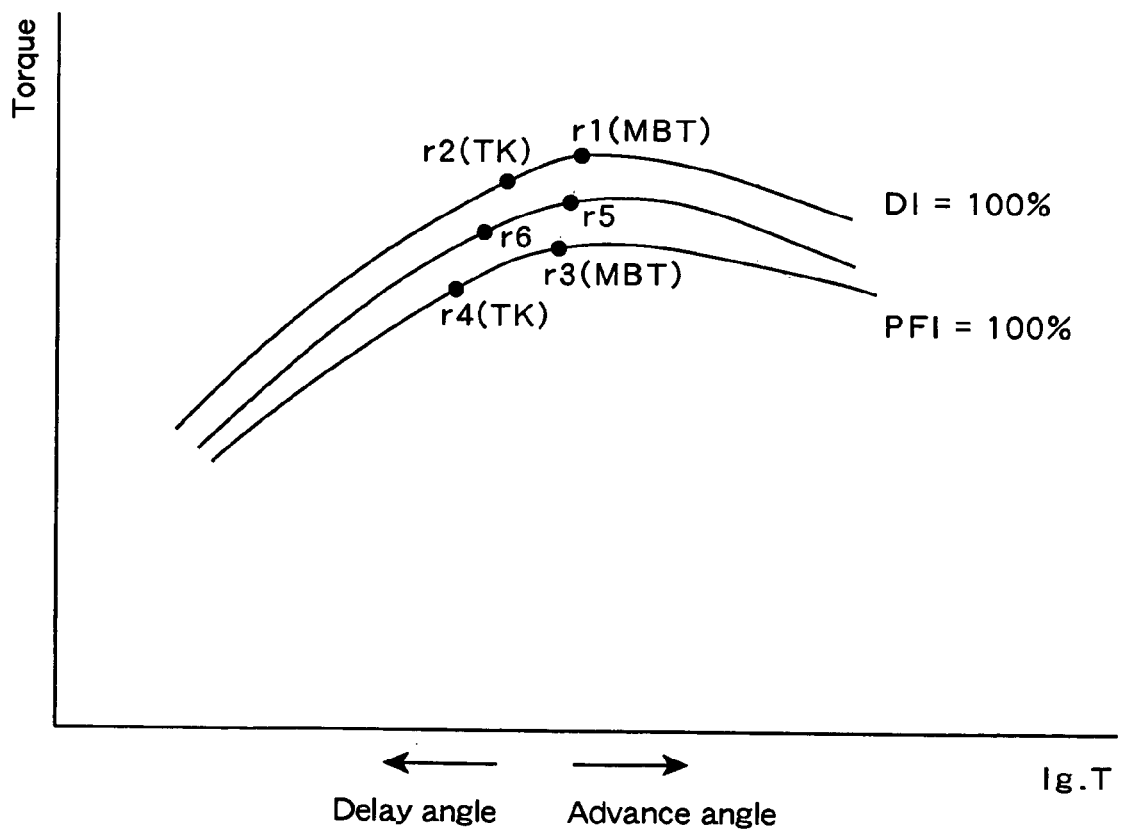
FIG. 6 is a map representing correction amount (degree)
FIG. 7 is a diagram showing a principle of an ignition timing control in this embodiment.

FIG. 6 shows a frame format representing a correction amount map. The correction amount map is allocated with correction amount (correction angle value) correcting the ignition timings with respect to A° C., B° C., C° C. - - - N° C. (A, B, C, - - - , N are a predetermined values), with a water temperature of a cooling water of the engine being a parameter.

The ECU 35 is also equipped with means or functions for calculating the ignition timings for the cylinders 12 by using the four sheets of ignition timing maps and the correction amount maps and for controlling the ignition timings which outputs commands for ignition to the ignition plugs 14a at the ignition timings.

FIG. 7 is a pattern diagram showing the principle of the ignition timing control of the ECU 35 in the embodiment. In this figure, the axis of abscissa represents the ignition timing Ig.T, in which the right direction is an advance angle side and the left direction is a delay (lag) angle side and the axis of ordinate represents torque.

When values of the torque with respect to the ignition timings are shown, a mount-shape curve (which is called "ignition timing—torque curve") will be described, and the top point of this ignition timing—torque curve indicates the MBT, and the TK is positioned on one side of this top point. The shape of the ignition timing torque curve, and the positions of the top point of the curve and the TK on the curve differ from the cases of the DI injectors 15 to the case of the PFI injectors 16. Therefore, for example, in the assumption that the engine revolution sensor 38 and engine load sensor 39 gain, respectively, one value in one sampling time, and these values correspond to points r1 to r4 (same point on the figures) shown in FIGS. 5A to 5D, the points r1 and r2 are points on one ignition timing—torque curve (DI=100% curve in FIG. 7) and the points r3 and r4 are points on other ignition timing—torque curve (PFI=100% curve in FIG. 7).

When the internal combustion engine is driven while adjusting the fuel injection quantity or ratio of the DI injectors 15 and the PFI injectors 16 in accordance with the operating condition of the engine, if a value is interpolated, depending on a ratio of the fuel injection quantity of both the injectors 15 and 16, as shown in FIG. 7, a further ignition timing—torque curve (intermediate curve) of the interpolated value is formed between the above-mentioned upper and lower ignition timing—torque curves (DI=100% curve and PFI =100% curve). On this intermediate curve, a first interpolated value r5 is formed on a line connecting the values r1 and r3 and a second interpolated value r6 is formed on a line connecting the values r2 and r4.

By deciding one value, positioned on the delay angle side, of these interpolated values r5 and r6 to be an ignition timing of the cylinder 12, the generation of the knocking to the cylinder 12 can be prevented and the optimum ignition timing control can be performed even if the DI injector 15 and the PFI injector 16 are used at any fuel injection ratio. Thus, in the case of FIG. 7, the second interpolated value r6 is employed as the ignition timing of the cylinder 12.

Figure 8:
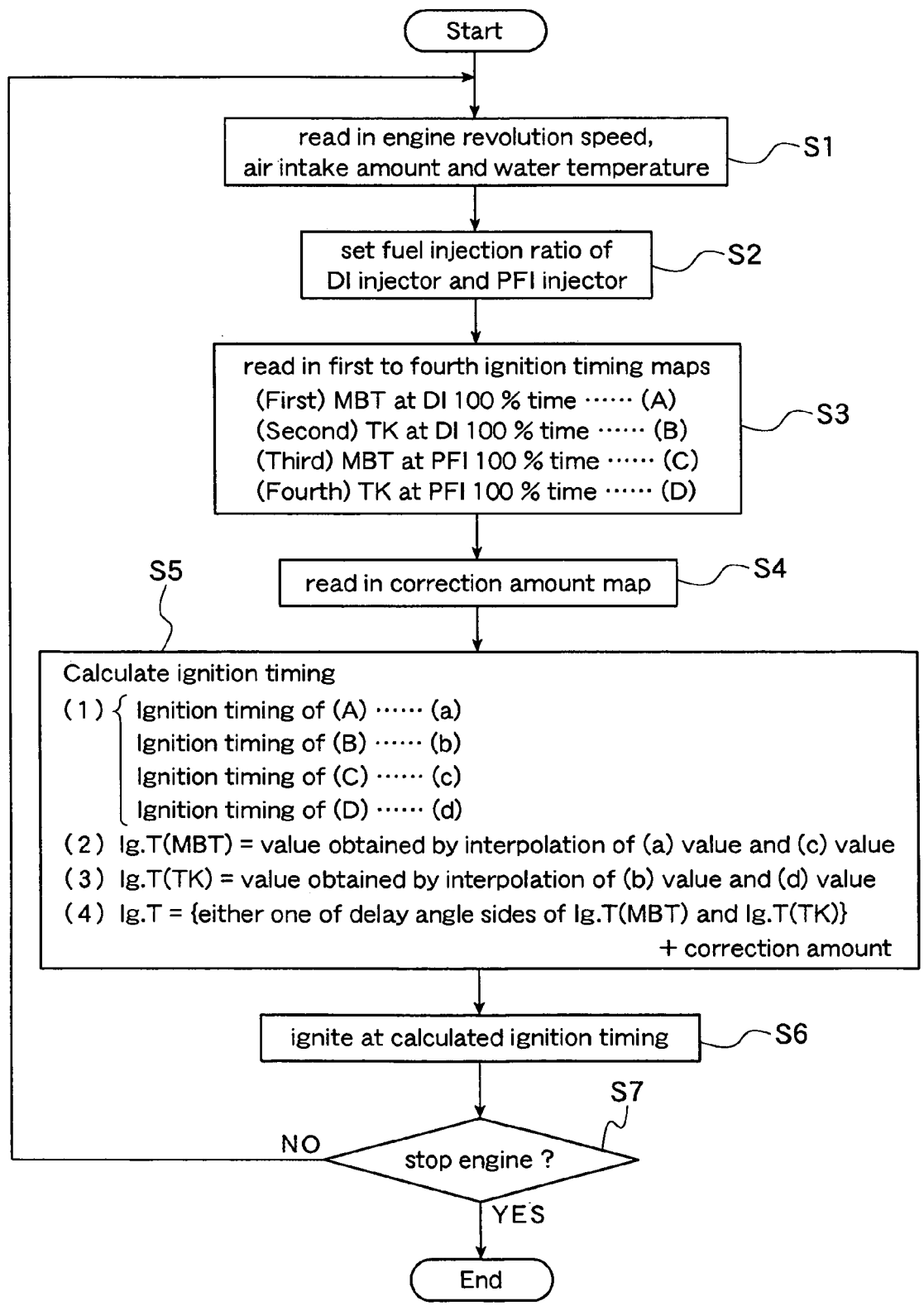
FIG. 8 is a flowchart showing a flow representing an ignition timing control steps of the internal combustion engine of this embodiment.

FIG. 8 is a flowchart indicating the engine ignition timing control steps according to the described embodiment, and the operation or function of the embodiment will be described hereunder with reference to this flowchart.

The ECU 35 reads in the values from the engine revolution speed sensor 38, engine load sensor 39 and water temperature sensor 41 at every predetermined sampling timing (step S1). The ECU 35 then sets the ratio of the fuel injection quantity (fuel injection ratio) of the DI injector 15 and the PFI injector 16 in response to the engine revolution speed and engine load values read in the ECU 35 in the former step S1 (step S2). As a result in this calculation, there will be caused three cases of fuel injection of only the DI injectors 15, fuel injection of only the PFI injectors 16 and fuel injection of both the injectors 15 and 16.

The ECU 35 then reads in the first to fourth ignition timing maps (A) to (D) (step S3).

The ECU 35 further reads in the correction amount map on the basis of the value from the water temperature sensor 41 (step S4).

The ECU 35 performs the following calculations (1) to (4) and calculates the ignition timing (step S5).

(1) The ECU 35 calculates the following values of the ignition timings (a) to (d) as basic ignition timings on the basis of the engine revolution speed and intake air amount read in the step S1 and the four sheets of ignition timing maps read in the step S3.

(a) Ignition timing at the MBT at the time of the fuel ignition quantity ratio (100%) of the DI injector 15 based on the first ignition timing map (A).

(b) Ignition timing at the TK at the time of the fuel ignition quantity ratio (100%) of the DI injector 15 based on the second ignition timing map (B).

(c) Ignition timing at the MBT at the time of the fuel ignition quantity rate (100%) of the PFI injector 16 based on the third ignition timing map (C).

(d) Ignition timing at the TK at the time of the fuel ignition quantity rate (100%) of the PFI injector 16 based on the fourth ignition timing map (D).

In a case that the read-in engine revolution speed and engine load are coincident with the values allocated on the first to fourth ignition timing maps (A) to (D), the values on the respective ignition timing maps are decided to be ignition timings of the above (a) to (d).

On the contrary, in a case that the read-in engine revolution speed and engine load are not coincident with the values allocated on the first to fourth ignition timing maps (A) to (D), the values are calculated on the basis of values near the values on the respective ignition timing maps. For example, as shown in FIG. 5, when the values of the engine revolution speed and engine load indicate a point P, in this case the point P being a point not allocated on the ignition timing maps (A) to (D), distances between the point P and points q1 to q4 allocated at four portions surrounding the point P are respectively calculated, and then, values each depending on the distance between the point q1 and the point P, . . . and a distance between the point q4 and the point P are multiplied by each value of the points q1 to q4. The thus obtained values are decided to be the ignition timings at the point P.

(2) The value obtained through the interpolating operation of the (a) value and (c) value calculated in the above (1) is made as a first interpolated value Ig.T (MBT). The interpolating operation calculates a value depending on the ratio of the fuel injection quantity of the DI injector 15 to the PFI injectors 16 calculated in step S2 from the (a) value and (c) value. For example, in the case where the ratio of the fuel injection quantity is such that the fuel injection quantity of the DI injectors 15 is of 60% and that of the PFI injectors 16 is of 40%, the value will be calculated based on the equation of (a)×0.6+(c)×0.4.

(3) The value obtained through the interpolating operation of the (b) value and (d) value calculated in the above (1) is made as a second interpolated value Ig.T(TK). The interpolation operation is effected as like as in the above (2).

(4) In comparison of the first interpolated value Ig.T (MBT) with the second interpolated value Ig.T (TK), the correction amount read in the step S4 is added to a value on the delay angle side of either one of these values, this value being calculated as ignition timing Ig.T.

The ECU 35 carries out, after the step S5, the ignition of the fuel in the cylinder 12 at the ignition timing calculated in the step S5 (step S6).

The above steps will be continued up to the stop of the operation of the engine (step S7).

As mentioned above, in the present embodiment, the ignition timing of the cylinder 12 is controlled by the ECU 35 in the use of the first and second ignition timing maps of the DI injection system and the third and fourth ignition timing maps of the PFI injection system. According to such an easy controlling, the ignition timing of the cylinder 12 can be adapted to the MBT and TK.

In addition, according to this embodiment, the calculation of the ignition timings (a) to (d) is made with reference to the values allocated in the first to fourth ignition timing maps (A) to (D). Accordingly, a place where the values is not allocated in the respective timing maps (A) to (D) can be easily calculated based on the respective timing maps.

Further, according to this embodiment, carrying out of the allocation of only the ignition timings at the time of the fuel injection only for DI injector 15 or PFI injector 16 by using the first to fourth injection timing maps (A) to (D) can eliminate labor for carrying out experiments while regulating the fuel injection quantity in the combined use of both the injectors 15 and 16 at the time of preparing the maps, and the accurate ignition timing maps (A) to (D) can be prepared with less steps involved.

Moreover, in this embodiment, the first interpolated value is calculated through the interpolating operation depending on the ratio of the fuel injection quantity by utilizing the ignition timing maps (A) and (C) of the maximum torque generation times in the DI and PFI systems, the second interpolated value is likely calculated through the interpolating operation depending on the ratio of the fuel injection quantity by utilizing the ignition timing maps (B) and (D) at the knocking limit torque generation time in the DI and PFI systems, and either one value of the delay angle sides of the first and second interpolated values is determined as the ignition timing of the cylinder. According to these steps, in the internal combustion engine provided with two series of fuel injection systems such as DI system and PFI system, even in the case of driving the engine while regulating the fuel injection quantity of the DI injector 15 and the PFI injector 16 in response to the engine operating condition, the ignition timing can be kept always in the optimum operating condition of the engine by using only the four sheets of the ignition timing maps without performing any complicated calculation or operation processing.

Furthermore, according to this embodiment, the engine revolution speed and the engine load can be detected by the engine revolution speed sensor 38 and the engine load sensor 39, respectively, and therefore, the ignition timing control can be realized with the engine revolution speed and engine load being the parameters.

Still furthermore, according to this embodiment, the amount of the load applied to the engine can be surely detected by providing, as engine load detection means, at least either one of the intake air amount detection sensor, the accelerator opening detection sensor or the intake pipe negative pressure detection sensor.

Still furthermore, according to this embodiment, the ignition timing can be regulated in accordance with the engine warm-up condition which is apt to give influence to the ignition timing by detecting the temperature of the engine cooling water by the water temperature sensor 41 and calculating the correction amount of the ignition timing depending on the water temperature.

Further, in this embodiment, although the correction amount is calculated in accordance with the engine cooling water temperatures any other detection sensor may be utilized as far as it can steadily detect the amount based on the engine operating condition.

Furthermore, in the described embodiment, more than one of both the injectors 15 and 16 may be disposed to each of the cylinders in place of the locations of the DI injector 15 and the PFI injector 16 to each cylinder 12. Moreover, other than the above example of arrangement of the DI injector and the PFI injector, there may take an arrangement of the DI injector 15 to each cylinder 12, upstream sides of the intake pipes disposed to the intake ports 13 of the respective cylinders 12 are bundled into one assembly, and one PFI injector 16 is then provided for the bundled intake pipes.

It is further to be noted that the present invention is not limited to the embodiment and modifications thereof mentioned above and other changes and further modifications may be made without departing from the scopes of the appended claims.

What is claimed is:

1. An internal combustion engine provided with double system of fuel injection, comprising:
    a direct injection injector;
    a port fuel injection injector;
    an engine operating condition detection unit for detecting engine operating condition;
    a fuel injection quantity control unit for monitoring the engine operating condition and controlling respective fuel injection quantity of the direct injection injector and the port fuel injection injector depending on the engine operating condition;
    a memory unit incorporated with four sheets of ignition timing maps including a first ignition timing map allocated on the basis of the engine operating condition so that the ignition timing of the engine at the fuel injection using only the direct injection injector substantially accords with the maximum torque generation timing, a second ignition timing map allocated on the basis of the engine operating condition so that the ignition timing of the engine at the fuel injection using only the direct injection injector substantially accords with the knocking limit torque generation timing, a third ignition timing map allocated on the basis of the engine operating condition so that the ignition timing of the engine at the fuel injection using only the port fuel injection injector substantially accords with the maximum torque generation timing, and a fourth ignition timing map allocated on the basis of the engine operating condition so that the ignition timing of the engine at the fuel injection using only the port fuel injection injector substantially accords with the knocking limit torque generation timing; and
    an ignition timing control unit for controlling the ignition timing of the cylinder by using a ratio of fuel injection quantity of the direct injection injector and the port fuel injection injector and the four sheets of the ignition timing maps.

2. The internal combustion engine provided with double system fuel injection according to claim 1, further comprising an ignition timing calculation unit for calculating a basic ignition timing with reference to the values allocated in the first to fourth ignition timing maps, calculating a first interpolation value obtained by performing interpolation operation of the basic ignition timing of the first ignition timing map and the basic ignition timing of the third ignition timing map depending on the ratio of the fuel injection quantity, calculating a second interpolation value obtained by performing interpolation operation of the basic ignition timing of the second ignition timing map and the basic ignition timing of the fourth ignition timing map depending on the rate of the fuel injection quantity, and comparing the first and second interpolation values with each other to thereby determine either one of the interpolation values on a delay angle side as the ignition timing.

3. The internal combustion engine provided with double system fuel injection according to claim 2, wherein the engine operating condition detection unit includes a water temperature detection sensor for detecting a cooling water of the internal combustion engine, and the ignition timing calculation unit serving to calculate a correction amount of the ignition timing depending on the water temperature of the cooling water.

4. The internal combustion engine provided with double system of fuel injection according to claim 1, wherein the engine operating condition detection unit includes a revolution speed detection means for detecting a revolution speed of an internal combustion engine, and a load detection means for detecting the load of an internal combustion engine.

5. The internal combustion engine provided with double system of fuel injection according to claim 1, wherein the engine load detection means includes at least either one of an intake air amount detector, an accelerator opening detector and an intake pipe negative pressure detector.

* * * * *

UNITED STATES PATENT AND TRADEMARK OFFICE
CERTIFICATE OF CORRECTION

| | | |
|---|---|---|
| PATENT NO. | : 7,216,627 B2 | Page 1 of 1 |
| APPLICATION NO. | : 11/378070 | |
| DATED | : May 15, 2007 | |
| INVENTOR(S) | : Ito et al. | |

It is certified that error appears in the above-identified patent and that said Letters Patent is hereby corrected as shown below:

At column 9, line 40, please delete "temperatures" and insert -- temperature, --, therefore.

Signed and Sealed this

Thirtieth Day of October, 2007

JON W. DUDAS
*Director of the United States Patent and Trademark Office*